H. E. GOODELL.
MITER BOX.
APPLICATION FILED JAN. 27, 1909.
978,576.
Patented Dec. 13, 1910.
2 SHEETS—SHEET 2.
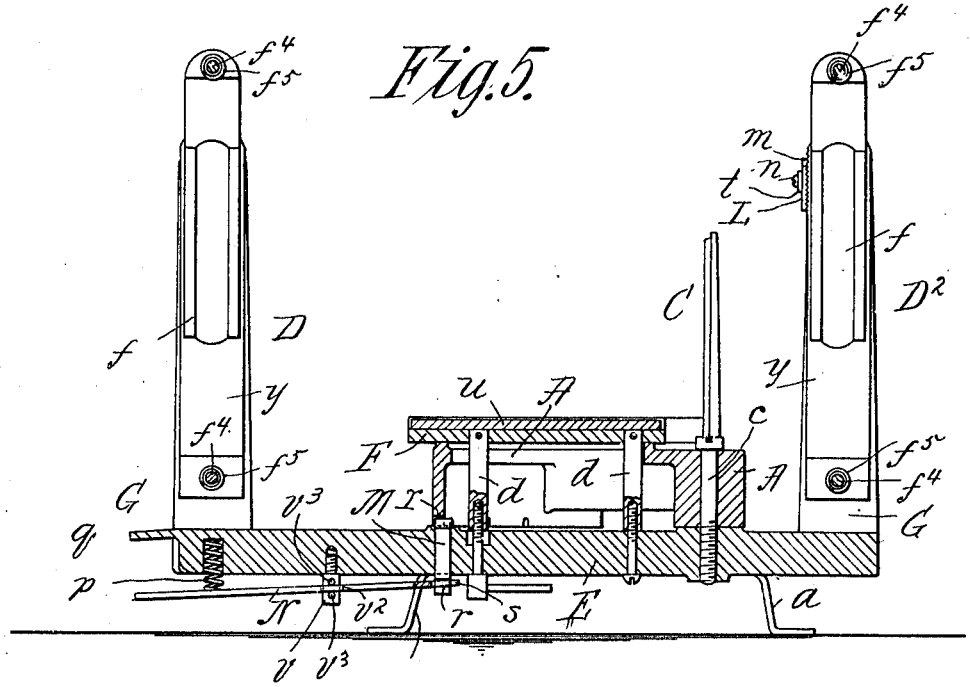
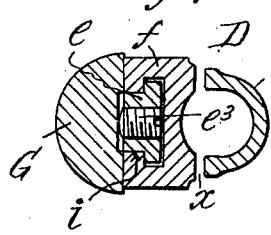
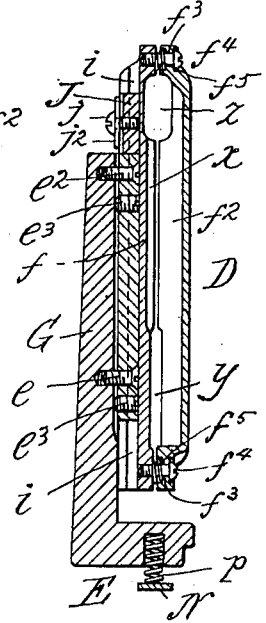
WITNESSES:
H. L. Sprague
P. M. Mowry
INVENTOR.
Henry E. Goodell,
BY
Wm. H. Bellows
ATTORNEY.

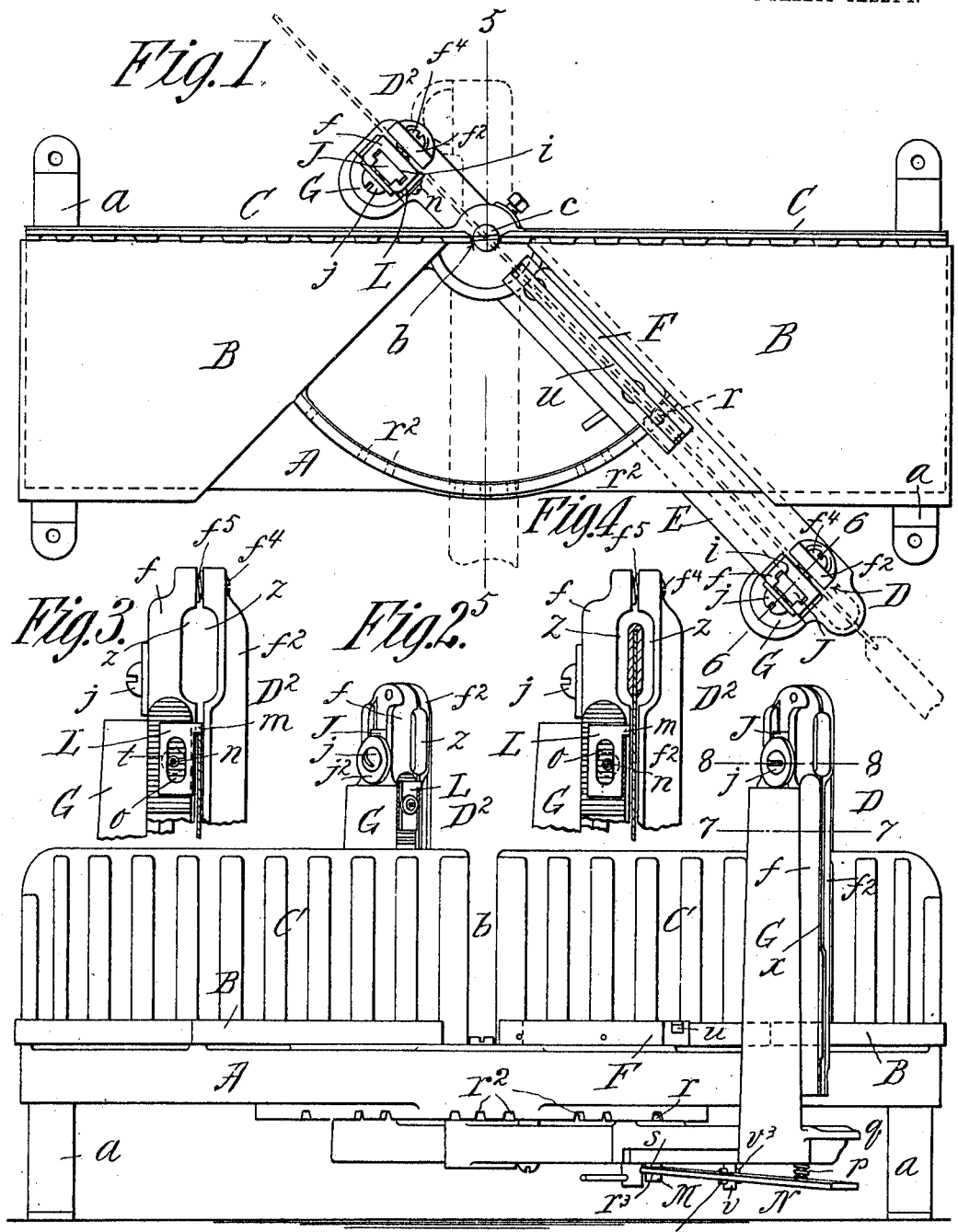

UNITED STATES PATENT OFFICE.

HENRY E. GOODELL, OF GREENFIELD, MASSACHUSETTS.

MITER-BOX.

978,576. Specification of Letters Patent. Patented Dec. 13, 1910.

Application filed January 27, 1909. Serial No. 474,599.

*To all whom it may concern:*

Be it known that I, HENRY E. GOODELL, a citizen of the United States of America, and resident of Greenfield, in the county of Franklin and State of Massachusetts, have invented certain new and useful Improvements in Miter-Boxes, of which the following is a full, clear, and exact description.

This invention relates to improvements in miter boxes, sometimes termed "miter boards," of a kind comprising a table-like frame for supporting the stock to be sawed, having an upright back with a vertical recess through the middle thereof, a pivotal radius bar carrying, both forward and to the rear of the table, upright saw guides and means for locking the saw guide carrying radius bar at any desired angle relatively to the frame whereby a board or piece of wood may be sawed either exactly at a right angle or at any predetermined acute or obtuse angle to its length.

A miter box of the general character to which this invention pertains is exemplified in Letters Patent of the United States granted to me Feb. 9, 1904, No. 751,908.

The present improvements particularly pertain to saw guides which comprise separated vertical members through which the saw blade is guided, with provisions for adjusting the members for widening or narrowing the opening through which the saw plays to accommodate the saw blades of different thicknesses and also to take up any wear that may be on the saw blades.

The invention furthermore pertains to improved constructions of the saw guides whereby in the use of "back saws" the operation of the saw in a downward direction may be as predetermined only partially through the stock to be cut.

The invention furthermore pertains to provisions on one of the saw guides whereby in the use of a panel saw the same will be prevented from unduly riding upwardly above its proper working position.

The invention furthermore pertains to improvements in the construction of the catch or stop device, which is provided as an appurtenance to the radius bar and is operative to engage in notches provided in an arc-shaped under portion of the table-like frame, to the end of simplifying such device and of rendering it susceptible of cheaper construction than heretofore; and the invention furthermore pertains to an improvement in the member which is carried by the radius bar, positioned above the same at substantially the level of the table and along a length of which the saw runs and onto which the teeth of the latter may bottom when the work is sawed through, to the end of providing a non-destructive material onto which the teeth of the saw may come.

The invention consists in combinations and arrangements of parts and the constructions of certain of the parts of all substantially as hereinafter fully described in conjunction with the accompanying drawings and set forth in the claims.

In the drawings:—Figure 1 is a plan view of the improved miter box with the saw guide carrying radius bar swung to its extreme right hand position, the hand saw being indicated by dotted lines; Fig. 2 is a front elevation of the same; Fig. 3 is an elevation on a larger scale of the upper portion of the rear saw guide and showing the saw stop as adjusted in its position for limiting the upward movement of a panel saw, a portion of the blade of which latter is indicated in transverse vertical section; Fig. 4 is a view similar to Fig. 3, but showing the stop as in a changed position so as to constitute no obstruction to the operation of a "back saw," the upper portion of which is represented in transverse vertical section; Fig. 5 is a cross section of the miter box as shown with the radius bar squarely crosswise of the length of the table-like frame, as represented by dotted line indication in Fig. 1, the plane of section being as taken on the line 5—5, Fig. 1, which is between the separated members of the front and rear saw guides; Fig. 6 is a vertical section transversely through one of the saw guides as taken on the line 6—6, Fig. 1; Fig. 7 is a horizontal cross section through one of the saw guides as taken on the line 7—7, Fig. 2; Fig. 8 is a horizontal cross section through one of the saw guides taken on the line 8—8, Fig. 2.

Similar characters of reference indicate corresponding parts in all of the views.

In the drawings,—A represents a more or less open or skeleton-like table-frame having supporting legs *a* and provided with board sections B B formed with angular inner ends and C represents the upstanding miter box back made with a central vertical opening at $b$ for the free passage of the saw in its working movement.

D and $D^2$ represent the saw guides mounted on and carried by the forward and rearward portions respectively of the radius bar E which is located and arranged horizontally under the table A and pivotally connected thereto at $c$.

The radius bar supports by the pillars $d$, $d$, in a plane at or slightly above the top of the table a bar F to constitute a direct support under the stock along the sawing line.

Particularly describing the saw guides and the combination, or manner of arrangement thereof, with the radius bar E;—G G represent posts affixed to, or formed as one with, the forward and rearward portions of the radius bar and provided each with a substantially T-shaped rib $e$, such rib in the present instance, and as particularly shown, cross sectionally in Fig. 7 and in vertical longitudinal section in Fig. 6, being constituted by a separately formed T-shaped bar (which to all intents and purposes is the same as if made strictly and specifically of a dove-tail form); and the said rib forming bar is held vertically to the face of the post by the screws $e^2$, $e^2$, the heads of which are countersunk within the outer face of the bar while the shanks thereof pass loosely through the bar and with screw thread engagements into the post. And there is a capability for adjustment of the rib forming bar and a capability for confinement of the bar when adjusted so that it stands more or less,—within slight limits, however,—offset from the face of the bar, by reason of the aforesaid screws $e^2$, $e^2$, and the stops screws $e^3$, $e^3$, which have thread engagements transversely through and slightly beyond the thickness of the bar so that their inner ends which slightly protrude, have engagements against the face of the post.

The saw guides comprise members or sections $f$ and $f^2$ which are separated one from another, as clearly shown in Fig. 6, so as to leave a slot-like opening $x$ for the free play therethrough of the saw blade; and in order that the guiding bearing of the saw guide may not be of too great length to become factors of excessive friction, the guiding sections have their approached portions freed out or recessed, as indicated at $y$, while the upper portions of the saw guide sections $f$, $f^2$, have the considerably wider recesses $z$ $z$ to constitute an opening of sufficient width and height for the free accommodation of the back of a "back saw."

Each saw guide section $f^2$ has transverse perforations $f^3$ in its upper and lower portions, and headed screws $f^4$ are provided, the shanks of which are passed loosely through said perforations in the one saw guide member $f^2$, and with a screw thread engagement into the other saw guide member $f$, so that by turning the screws one way or the other, the sections may be relatively closer or farther apart to narrow or widen the slot-like opening $x$ for the saw; and when the screws are turned outwardly, the saw guide member $f^2$ is automatically forced, in the slight degree permitted, away from the saw guide member $f$ by the reaction of the spiral springs $f^5$ which encircle the screws and which are in compression between the members.

It will be perceived that the slot-like openings through the saw guides may be comparatively wide or narrow for the accommodation of saw blades of varying thicknesses and for providing for wear on the blade of any given saw; and also that the saw guiding opening whether rendered wide or narrow may be centralized relatively to the longitudinal line of the radius bar and of the stock supporting bar F carried thereby and ranged therewith, by the adjusting capabilities constituted by the rib adjusting screws $e^2$, $e^2$, and the stop screws $e^3$, $e^3$.

At times when a back saw is being used and it is desired that the extent of the cut by the saw in a downward direction shall be limited, so that it will only make a kerf partially through, and at a predetermined limit, in the thickness of the board or piece being worked upon, the improved stop block J is made use of, the same consisting of a dovetailed or T-shaped block, which is fitted and is adjustably slidable vertically in the groove $i$ which is vertically and longitudinally formed in each saw guide section or member $f$, and by which provision in conjunction with the aforementioned dovetail shaped rib $e$ each saw guide as a whole,—and comprising the members $f$ and $f^2$ with the connecting and adjusting screws $f^4$ and interposed spiral spring $f^5$,—is vertically movable relatively to its post G.

The block is located in the groove above the upper end of the rib $e$ appurtenant to the post and as shown in Figs. 6 and 8 it is penetrated by the shank of a screw $j$, the head of which, when the screw is inwardly turned, has a clamping or binding engagement against a washer $j^2$, all whereby, when the screw is tightened for the bind by its head against the washer the action of the threaded shank of the screw on the stop block is to bring the latter to bind against the walls of the slot inside of and marginally relatively to the contracted mouth of the substantially dove-tail shaped groove $i$.

When the stop block is adjusted in an upper position, the saw guides through which the thickened back of a back saw is engaged may after having been more or less raised at the commencement of a sawing operation, gradually descend so that the teeth of the saw may work entirely through the vertical dimension of the wood and pass into the trough-like opening in the bar F; but when it is desired to limit the extent of the cut of a back saw partially through the stock, the stop block J is adjusted and confined in position suitably far down within the upper end portion of the saw guide member $f$ so as to properly come to an abutment against the upper end of the rib $e$ on the post.

L represents a stop which is shown as provided on an upper portion of the rear saw guide $D^2$ which, when adjusted therefor, is operative to prevent an undue rising motion or upward "riding" of a panel saw when a saw of the latter description is employed,— this appliance being so shiftable on the saw guide as to in no way obstruct the free passage and movements through the saw guide of a "back" saw when one of the latter kind is used. This saw limiting stop L, as clearly shown in Figs. 3 and 4, comprises a plate provided with an angular extension $m$, and with an aperture $o$ therein which is of considerable vertical extent and which is also of considerable width relatively to the shank of the screw $n$ which is passed centrally through a washer $t$ and by its threaded shank very loosely through the aperture $o$ and with a screw thread engagement into the saw guide member $f$. The washer is preferably, though not necessarily provided to add to the efficiency of the binding means for the adjustable stop L. By moving the latter transversely as shown in Fig. 3, the stop for the panel saw is in its position effective as such; and, of course, because of the considerable vertical dimension of the aperture $o$, the stop in addition to being adjustable transversely to have its lug or projection $m$ across the slot-like saw opening, may be positioned either higher or lower, as requisite, on the saw guide. When a back saw is being used, as represented in Fig. 4, the saw stop L is transversely outwardly moved as there shown.

In the bar F, or "gib" as sometimes termed in miter boxes, I provide in the trough-like opening which runs from end to end in the top of the bar, a strip $u$ of rawhide or other suitable non-metallic material, so that after a saw has cut through a piece of stock and comes onto the bar, the saw teeth will not be injured by contact with any metallic substance.

Expedients for an inexpensive construction of the catch and its operating lever, employed for holding the radius bar at any of the angles for which provision is made, are shown as carried out in Figs. 2 and 5.

M represents the locking bolt which plays through a vertical aperture $r$ in the radius bar and which by its upper end may engage into and disengage from the notches $r^2$ in the depending arc-shaped front portion of the table-like frame A. This bolt has a groove $r^3$ in its lower end portion, which grooved portion is embraced and engaged by the fork-like rear end $s$ of the catch lever N.

The means for providing a fulcrum for the lever is as follows:—A depending stud $v$ is provided at a suitable portion on the radius bar forward of the catch bolt $r$, and the catch lever N has an aperture $v^2$ at an intermediate portion in its length whereby it is made to embrace the depending stud; and transversely extending pins $v^3$, $v^3$, are passed transversely through the depending stud above and below the lever, their diametrically oppositely extending outer portions engaging above and below the middle part of the lever, making a rocking support or substantially a pivot therefor.

Near the forward end of the catch lever N which underlies the thumb piece $q$ of the radius bar, a spiral spring $p$ is provided in compression between the lever and radius bar for maintaining the catch normally in its position of interlock in any given one of the angle determining notches $r^2$. This catch device in its general arrangement and manner of operation is quite similar to the catch device shown in the corresponding situation in my aforementioned patent of Feb. 9, 1904; and while the miter box which is here illustrated and which has been described, in its general aspect very much resembles the heretofore patented miter box, the present one comprises advantages and practical and commercial merit, not heretofore found, by reason of the several provisions and constructions which have at length and with definiteness been described.

A material accomplishment comprised in this invention is that it is possible to provide for a mechanic a miter box which meets his every requirement, and conduces to increased convenience, at an attractively decreased cost.

I claim:—

1. In a miter box, the combination with a leg supported base, of a radius bar pivoted to a rear portion of the base and extending rearwardly and forwardly beyond the latter and having at its rear and forward portions upstanding saw guides each comprising vertical members which are separated one from the other, and movable transversely the one relatively to the other, one saw guide member having transverse perforations in its upper and lower portions, headed screws, the shanks of which are passed loosely through said perforations in the one saw guide member, and with a screw thread engagement into the other saw guide member, and spiral springs encircling the intermediate portions of the screw shanks, and in compression between the saw guide members.

2. In a miter box, the combination with a base, of a radius bar pivoted thereto and extending rearwardly and forwardly therebeyond, having at its rear and forward portions fixed upstanding vertical posts, provided with vertical substantially T-shaped ribs, and saw guides comprising members which are separated one from the other, a member of both pairs of saw guides having substantially T-shaped grooves, for vertically slidable engagements with the said ribs of the posts, and stop blocks fitted in the upper portions of said grooves, washers against the grooved faces of the saw guide members, and screws having their shanks extended through the washers and through the mouths of the grooves, with a threading engagement in said stop blocks and having their heads engaging the faces of the washers.

3. In a miter box comprising a table-like base and a horizontal radius bar pivoted to and adapted to swing under the base and having at its front and rear portions upstanding saw guides comprising opposed members with a slot-like opening therebetween and a member of one of the guides having on its face adjacent the slot opening a plate provided with an angular extension, and provided with a comparatively large hole therethrough, a washer overlying the apertured portion of the plate and a screw the shank of which is passed through the washer, and said hole, and with thread engagement in the saw guide member,—the head of the screw engaging the face of the washer.

Signed by me at Greenfield, Mass., in presence of two subscribing witnesses.

HENRY E. GOODELL.

Witnesses:
PERLEY E. FAY,
FREDERICK B. FELTON.